United States Patent [19]

Panchisin

[11] Patent Number: 4,975,550
[45] Date of Patent: Dec. 4, 1990

[54] SECURITY DEVICE FOR COMPUTERS

[76] Inventor: S. Joseph Panchisin, 2108 Wildwood Dr., Wilmington, Del. 19805

[21] Appl. No.: 364,142

[22] Filed: Jun. 12, 1989

[51] Int. Cl.$^5$ .................. H01H 27/06; G12B 9/00
[52] U.S. Cl. .................. 200/43.08; 200/51.00 R; 200/51.02; 200/43.01; 439/133; 439/148; 340/825.310
[58] Field of Search .............. 200/51.02, 51.11, 51 R, 200/43.02, 43.22, 43.01, 43.04, 43.05, 43.06, 43.07, 43.08, 43.11, 43.12, 51 LM, 27.1; 439/133, 134, 148; 340/825.31, 825.34

[56] References Cited

U.S. PATENT DOCUMENTS

| | | | |
|---|---|---|---|
| 2,759,159 | 8/1956 | Teetor | 439/133 |
| 2,851,550 | 9/1958 | Searcy | 200/51.02 |
| 4,029,382 | 6/1977 | Kōda | 439/272 |
| 4,586,843 | 5/1986 | Heng et al. | 248/27.1 |

Primary Examiner—Ernest G. Cusick
Assistant Examiner—David J. Walczak
Attorney, Agent, or Firm—Connolly & Hutz

[57] ABSTRACT

A security device for preventing unauthorized use of a personal computer includes a rigid housing which is attached to an exposed surface of the computer to conceal the keyboard actuator of the computer. Electrical connectors in the housing electrically connect the keyboard actuator with an externally accessible key switch. The key switch is movable to and from a first condition wherein the key switch actuates the keyboard and the second condition wherein the key switch prevents actuation of the keyboard.

16 Claims, 3 Drawing Sheets

SECURITY DEVICE FOR COMPUTERS

BACKGROUND OF THE INVENTION

The use of computers, particularly personal computers has become increasingly popular as computer technology improves wherein the costs for such computers has been reduced so as to be available to a large number of people. One of the problems with personal computers is the prevention of an unauthorized user having access to the computer. Various means have been provided attempting to restrict computer usage to only those who are authorized. The approaches heretofore taken however have been quite complicated and met with limited success.

SUMMARY OF THE INVENTION

An object of this invention is to provide a security device for personal computers which can readily be adapted to existing computer structures.

A further object of this invention is to provide such a security device which is of low cost without sacrifice to its ease of operation.

In accordance with this invention, the security device is in the form of a rigid housing which would be mounted to the surface of the computer having the keyboard actuator. An electrical connector in the housing would connect the keyboard actuator to a key switch which is exposed externally of the housing. The key switch is movable to and from a first condition wherein the key switch actuates the keyboard and a second condition wherein the key switch prevents actuation of the keyboard.

The housing may be generally permanently attached to the computer by adhesive means in one embodiment of the invention. In another embodiment of the invention the housing is detachably mounted by means of snap in connectors. In one embodiment of the invention the key switch is mounted directly on the housing. Alternatively, the key switch may be mounted remote from the housing.

THE DRAWINGS

DETAILED DESCRIPTION

Figure 1:
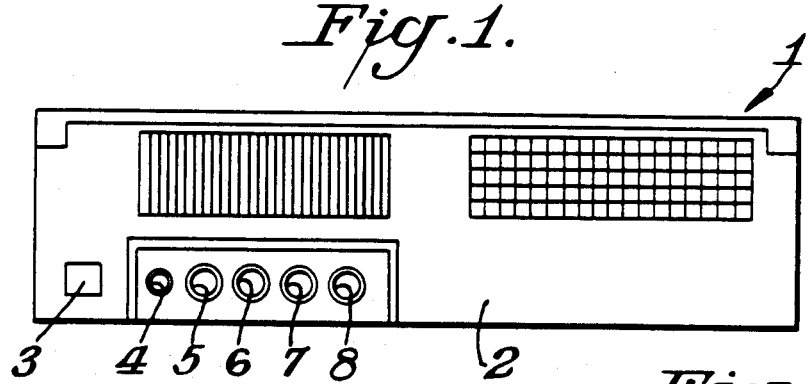
FIG. 1 is a rear elevation view of a conventional personal computer with which the invention may be used.

FIG. 1 illustrates a conventional personal computer 1. The specific computer 1 illustrated therein is a back view of the Mac II shown to scale. It is to be understood, however, that the illustration of a Mac II computer is simply for exemplary purposes and the invention may be practiced with other forms of computers. As shown in FIG. 1 the back wall or surface 2 of computer 1 has a number of ports or actuators including a power button 3, a speaker 4, keyboard/mouse actuators 5, 6, printer 7 and communications 8. As illustrated these various ports for the speaker, keyboard, mouse, printer and communications are arranged in the manner illustrated in FIG. 1 with a Mac II. The security device 10 (FIG. 2) is intended to conceal and thus render inaccessible the keyboard/mouse ports. Thus the invention could be carried out with other computers wherein the security device would likewise function to render inaccessible the keyboard/mouse ports.

Figure 2:
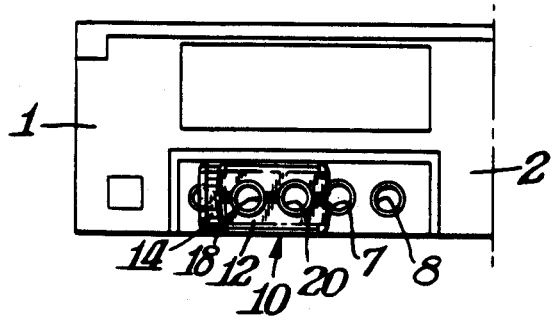
FIG. 2 is a back elevation view of a portion of the computer of FIG. 1 showing the security device of the invention mounted thereto.
Figure 3:
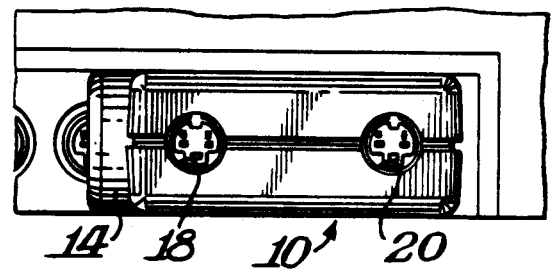
FIG. 3 is an elevation view of a portion of the computer shown in FIG. 2 on an enlarged scale.

In the embodiment illustrated in FIGS. 2-5 security device 10 is in the form of a two piece housing 12 which is secured to wall 2 of computer 1. A key switch 14 extends outwardly from the side of housing 12 and a key 16 would be inserted in the key switch 14 by an authorized user who would have physical possession of key 16. As shown in FIG. 3 housing 12 also includes mouse receptor or port 18 and keyboard receptor or port 20. These ports would be connected to key switch 14 and to each other as well as to the computer actuator ports in such a manner that actuation of the computer would be had by turning key 16. In the absence of a key in the key switch 14, however, actuation of the computer would be prevented.

As previously noted the invention is illustrated as being applied to a Mac II computer. Other suitable computers with which the invention may be used include the Mac SE and the IBM PS/II.

In the embodiment illustrated in FIGS. 2-3 housing 12 is mounted to computer wall 2 by a suitable adhesive or epoxy 22 which would in essence permanently mount the housing 12 to the computer 1.

Figure 4:
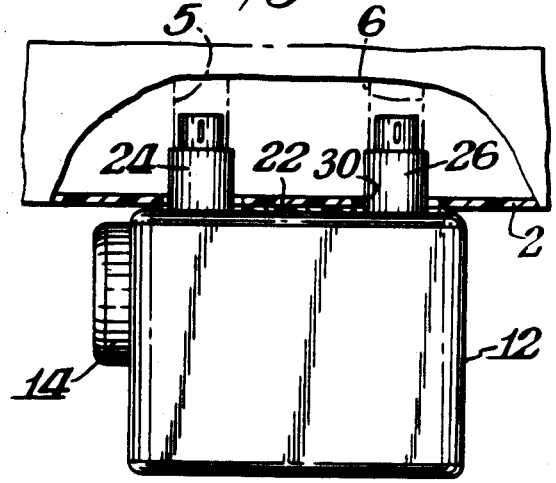
FIG. 4 is a plan view partly in section of the device shown in FIG. 3.
Figure 5:
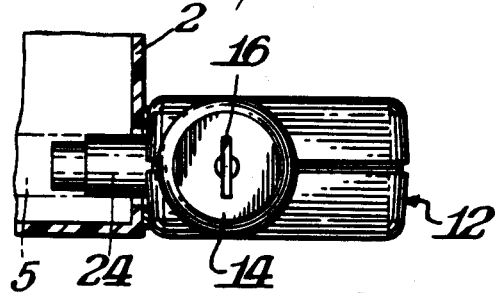
FIG. 5 is a side view partly in section of the device shown in FIGS. 3-4.

As shown in FIG. 4 housing 12 includes male jacks 24, 26 which fit into female receptors or ports 5, 6 respectively of the computer. In this manner, device 10 is attached to the back 2 of the central processing unit so as to conceal the keyboard/mouse ports 5, 6. Housing 12 is made of any suitable material preferably a hard plastic and would include three mini-din 4 jacks, two female jacks, one male jack and one dummy jack. The key switch 14 would be non-shorting four pole, single thrill. Where device 10 is used with an IBM computer it would have the same structure with the exception of the jacks and speaker jack. Device 10 would include 4 mini-din 6 jacks, two male jacks and two female jacks. The IBM device, however, would not use a speaker jack.

Figure 6:
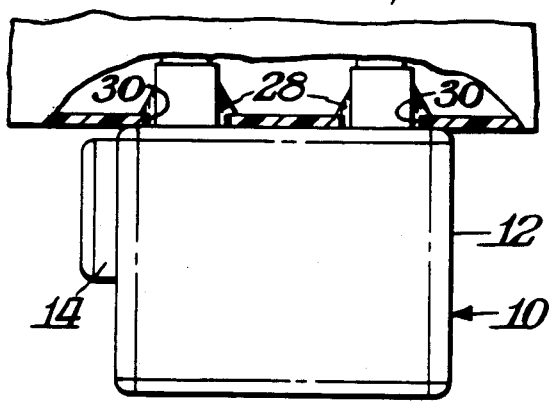
FIG. 6 is a view similar to FIG. 4 of a further embodiment of this invention.

FIG. 6 shows a variation of the invention wherein housing 12 is detachably mounted to wall 2 by means of snap connectors or clips 28 which fit through openings 30 in the wall of housing 2 and then expand to press against the inner surface of wall 2 thereby locking device 10 in place yet permitting its detachment when necessary or desired.

Figure 7:
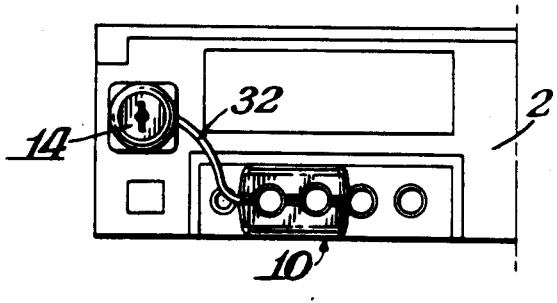
FIG. 7 is a view similar to FIG. 3 of yet another embodiment of this invention.

FIG. 7 shows a variation of the invention wherein the key switch 14 would be mounted remote from housing 12 but suitably connected thereto by means of electrical wiring in steel flex cable 32.

Figure 8:
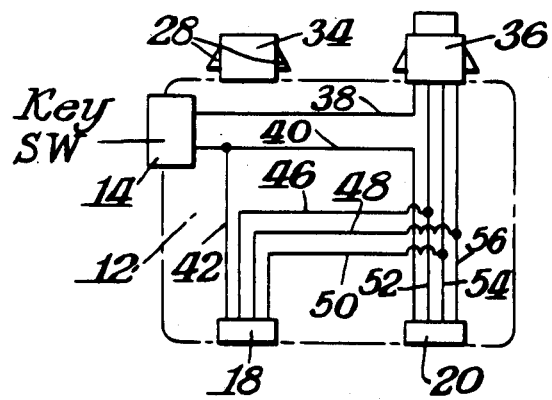
FIG. 8 is a schematic view illustrating the electrical connections of the embodiment of FIG. 6.

FIG. 8 schematically illustrates a circuitry for device 10. As shown therein device 10 includes receptors 18, 20 (FIG. 3) as well as jack 36 (which would correspond to jack 26) and dummy jack 34 which would correspond to jack 24 of FIG. 3. As illustrated therein key switch 14 has two wires 38, 40 running to it. One wire functions as the input and the other as the output. The input wire is a plus 5 volt DC and connects to the output wire through the key switch 14. The wires 38, 40 go into switch 14 and come out as a one to one ratio. The clips 28 can be located on the outside of the keyboard/mouse jacks. Wire 38 is electrically connected to jack 36 which is the male jack connected to the keyboard/mouse actuator 6 while 40 electrically connects key switch 14 with keyboard receptor 20 and also with mouse receptor 18 by means of wire 42 leading from wire 40. Mouse receptor 18 is electrically connected by means of wires 46, 48, 50 to wires 52, 54, 56 which electrically connect jack 36 with keyboard receptor 20 thereby placing the mouse receptor 18 in the circuit controlled by key switch 14. Jack 34 in the embodiment illustrated in FIG. 8 is a dummy jack and functions to prevent the unit 10 from turning. As previously indicated when key switch 14 is in one of its conditions, for example, without a key 16 place therein and/or without the key switch 14 being turned, there is no proper electrical connection sufficient to actuate the keyboard/mouse. By turning key switch 14 however to its other condition the proper electrical connection is made and the keyboard can be used.

Figure 9:
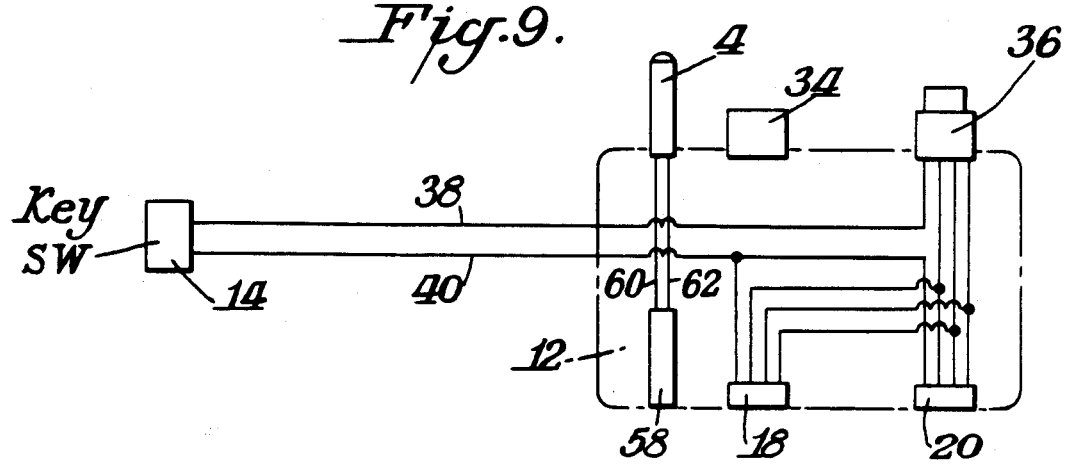
FIG. 9 is a schematic view illustrating the electrical connections of the embodiment of FIG. 7.

FIG. 9 illustrates the variation of invention shown in FIG. 7 wherein key switch 14 is mounted remote from housing 12. Otherwise the circuitry is the same as in FIG. 8. FIG. 9 also illustrates how housing 12 may be used to provide access to speaker port 4 by means of receptacle 58 electrically connected to port 4 by wiring 60, 62. In the embodiment of FIG. 9 the portion of wires 38, 40 which are external of housing 12 are protected by being mounted in for example a flexible steel cable 32.

Figure 10:
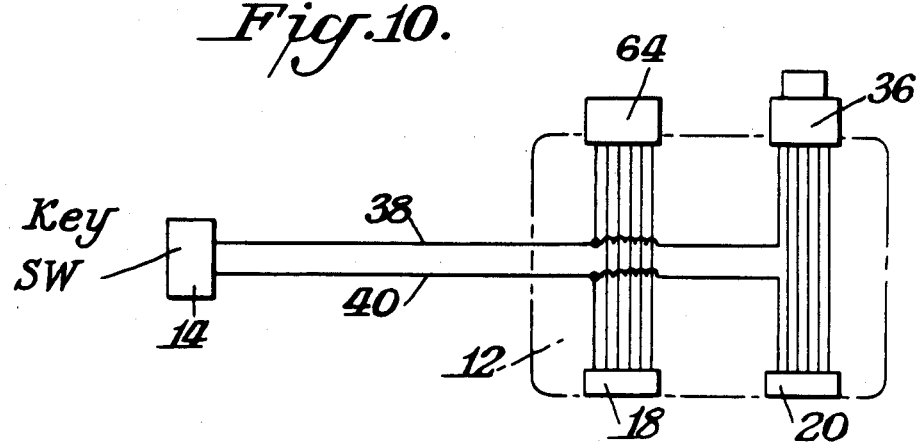
FIG. 10 is a schematic view similar to FIG. 9 of an alternative embodiment of the invention.
Figure 11:
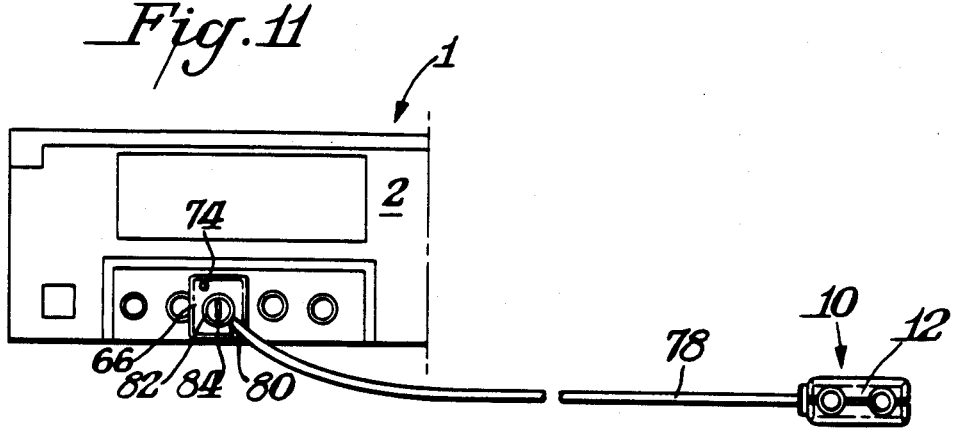
FIG. 11 is a back elevation view of a portion of a computer showing a security device of a further embodiment of this invention.
Figure 12:
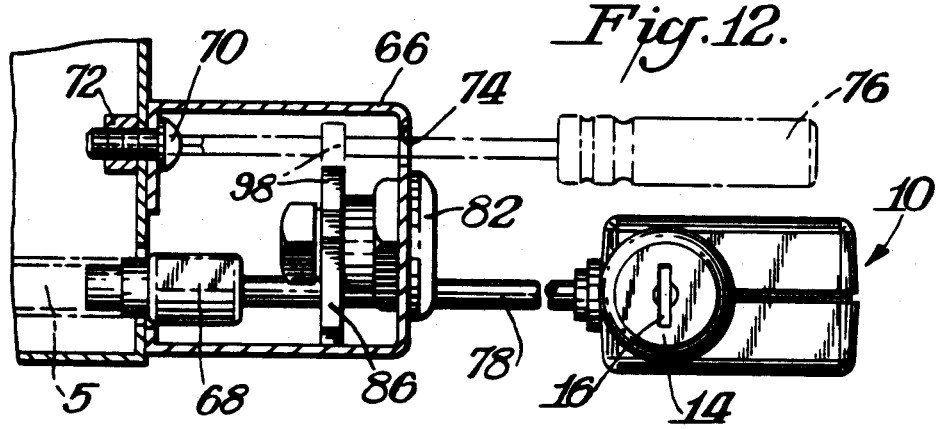
FIG. 12 is a cross-sectional side elevation view of the modified embodiment of FIG. 11.

FIG. 10 illustrates a further variation wherein a jack 64 is used instead of the dummy jack by having the wiring for each mini-din 6 male jack 64, 36 extend directly to its corresponding mini-din 6 female jack 18, 20.. The various circuitry illustrated in FIGS. 8-10 is intended to be exemplary and could include any other known techniques such as the provision of ground wires and other electrical techniques conventionally incorporated in such circuitry. The details of the circuitry is not critical as long as it permits the effectuation of the invention, namely the prevention of the keyboard actuation by an unauthorized user who is unable to actuate the key switch which in turn controls actuation of the keyboard.

FIGS. 11-14 show a further modification for practicing the present invention. As indicated therein the computer 1 would employ device 10 wherein the housing 12 is disposed remote from computer 1. Device 10 still functions as a security device facilitated by the inclusion of secondary housing 66 which is secured to back wall 2 of computer 1. Any suitable means of securement may be used. In the illustrated embodiment, jack 68 in housing 66 is coupled to port 5. A suitable fastener 70, such as a bolt, mounts housing 66 to back wall 2 by its engagement with nut 72 mounted to the inner side of back wall 2. Access is had to fastener 70 by the provision of a hole 74 in housing 66 so that a screw driver 76 may be inserted through hole 74 into a slot in fastener 70 to manipulate the fastener for either attaching or detaching housing 66.

The electrical connection between housing 12 and housing 66 is had by means of electrical cable 78 which extends from housing 12 into, for example, jack 68 of housing 66.

Figures 13, 14:
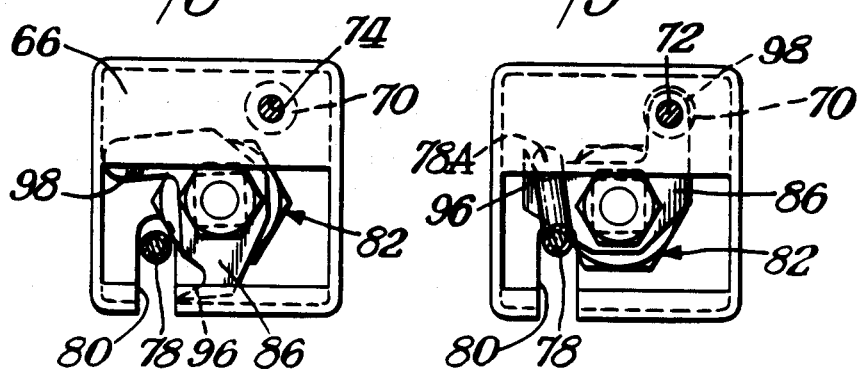
FIGS. 13 and 14 are back elevation views of a portion of the modified embodiment of FIGS. 11-12 in different phases of operation.

FIGS. 13-14 show means for safeguarding against detaching housing 66 or otherwise preventing access to the keyboard port of computer 1. As shown therein, the back wall of housing 66 includes a slot 80 into which cable 78 would extend. A key switch 82 is provided on the back wall of housing 66 to receive a key 84 for rotating flat plate 86 mounted within housing 66. Flat plate 86 includes an extension 96 which in the condition shown in FIG. 13 is located so as to permit slot 80 to be maintained completely open for receiving cable 78. In the condition shown in FIG. 13, a further extension 98 on plate 86 is also located in an inactive position. After housing 12 has been properly electrically connected to computer 1 and after housing 66 has been mounted to back wall 2, key 84 is rotated to rotate plate 86 from the condition shown in FIG. 13 to the condition shown in FIG. 14. During this rotation, extension 96 lifts a portion 78A of cable 78 above the end of slot 80, so as to lock cable 78 to housing 66. Additionally, when plate 86 is moved to the condition of FIG. 14, extension 98 is rotated so that it blocks opening 74 to prevent any manipulation of fastener 70, thereby assuring that housing 66 cannot be removed from computer back wall 2. The modification of FIGS. 11-14, otherwise functions in the same manner as in the previous embodiments except that device 10 may be located at a more remote location.

What is claimed is:

1. A security device for preventing unauthorized use of a personal computer having a keyboard actuator on an exposed surface of its central processing unit, said device being in combination with said computer, said device comprising a rigid housing, mounting means for attaching said rigid housing to said exposed surface to completely shield and conceal said keyboard actuator, a keyswitch, electrical connector means in said housing electrically connecting said keyboard actuator with said keyswitch, said keyswitch being exposed externally of said housing, and said keyswitch being movable to and from a first condition wherein said keyswitch actuates said keyboard and a second condition wherein said keyswitch prevents actuation of said keyboard.

2. The combination of claim 1 including a key detachably insertable into said keyswitch for controlling the selection of said first condition and said second condition.

3. The combination of claim 1 wherein said keyswitch is mounted on and supported by said housing.

4. The combination of claim 1 wherein said keyswitch is mounted remote from said housing.

5. The combination of claim 1 wherein said electrical connector means comprises an output wire and an input wire connected to said keyswitch.

6. The combination of claim 5 including a keyboard receptor and a mouse receptor mounted to an externally exposed wall of said housing, at least one jack for being electrically connected to said keyboard actuator, and said electrical connector means connecting said receptors to said jack and to said keyswitch.

7. The combination of claim 6 including a dummy jack having no electrical connection to said keyswitch, and said dummy jack comprising means to prevent said housing from turning.

8. The combination of claim 6 including a pair of said jacks electrically connected to said keyswitch.

9. The combination of claim 6 including a speaker receptacle on said housing electrically connected to the computer speaker port.

10. The combination of claim 6, wherein said computer having a mouse port and a keyboard port, and said housing concealing and preventing access to said mouse port and said keyboard port.

11. The combination of claim 1 wherein said mounting means comprises snap clips for detachably mounting said housing to said computer.

12. The combination of claim 1 wherein said mounting means comprises an adhesive.

13. The combination of claim 1 wherein said housing is mounted directly to said exposed surface.

14. The combination of claim 1 wherein said housing is remote from said exposed surface.

15. The combination of claim 14 wherein said housing is attached to said exposed surface by an electrical cable extending from said housing.

16. The combination of claim 15 including a secondary housing shielding and concealing said keyboard actuator, and said electrical cable extending to said secondary housing.

* * * * *